Figure 3:
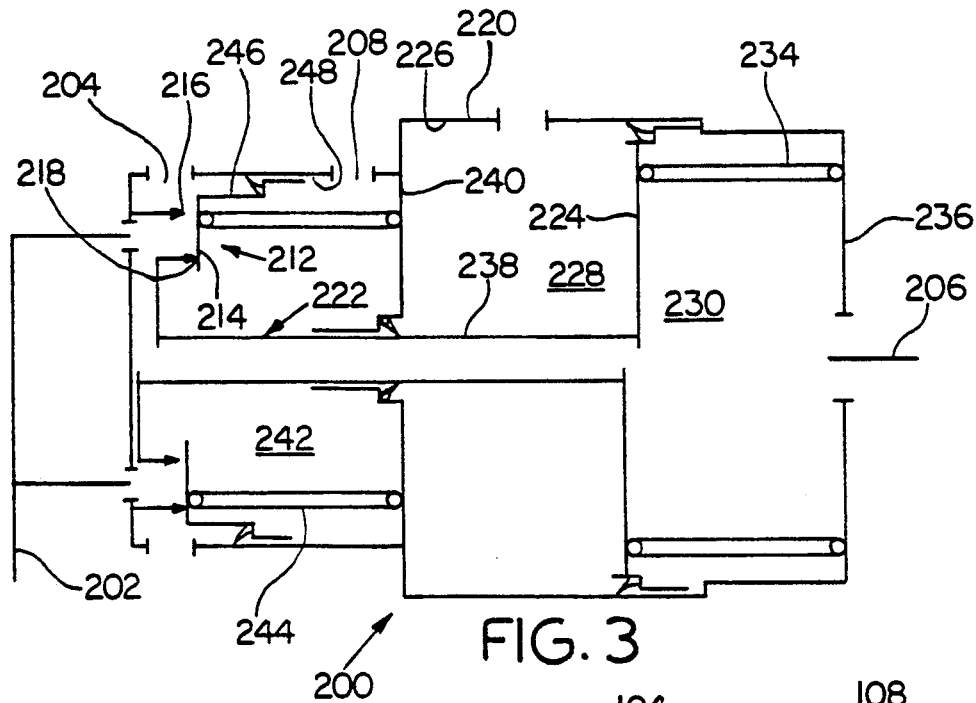

United States Patent [19]

Gautier et al.

[11] Patent Number: 5,226,347

[45] Date of Patent: Jul. 13, 1993

[54] PNEUMATIC BOOSTER

[75] Inventors: Jean-Pierre Gautier; Ulysse Verbo, both of Aulnay-sous-Bois; Miguel Perez, Argenteuil, all of France

[73] Assignee: Bendix Europe Services Techniques, Drancy, France

[21] Appl. No.: 878,275

[22] Filed: May 4, 1992

[30] Foreign Application Priority Data

May 14, 1991 [FR] France ................... 91 05844

[51] Int. Cl.$^5$ .................. F15B 9/10; B60T 8/32
[52] U.S. Cl. ....................... 91/369.2; 91/376; 92/99; 188/356
[58] Field of Search ............ 188/356, 357; 91/369.1, 91/369.2, 370, 372, 376 R; 60/547.1, 547.2, 548, 582; 92/99, 101

[56] References Cited

U.S. PATENT DOCUMENTS

| | | | |
|---|---|---|---|
| 4,033,636 | 7/1977 | Rolt et al. | 303/114 |
| 4,640,097 | 2/1987 | Kobayashi | 91/369.2 X |
| 4,708,401 | 11/1987 | Klein | 188/356 X |
| 4,875,740 | 10/1989 | Takayama | 188/356 X |
| 5,000,002 | 3/1991 | Belart | 60/547.1 |
| 5,096,267 | 3/1992 | Volz | 91/369.1 X |

FOREIGN PATENT DOCUMENTS

| | | |
|---|---|---|
| 1277047 | 9/1968 | Fed. Rep. of Germany . |
| 3821225 | 2/1989 | Fed. Rep. of Germany . |
| 3918012 | 12/1990 | Fed. Rep. of Germany . |
| 59-134048 | 8/1984 | Japan . |
| 0157951 | 8/1985 | Japan ................. 91/369.2 |
| 2103320 | 2/1983 | United Kingdom . |
| 2171768 | 9/1986 | United Kingdom ............ 91/376 R |

Primary Examiner—Edward K. Look
Assistant Examiner—Hoang Nguyen
Attorney, Agent, or Firm—Larry J. Palguta; Ken C. Decker

[57] ABSTRACT

The invention relates to a pneumatic brake-booster comprising a casing (10), inside which is situated a movable wall (12, 14) returned to a rear position of rest by a resilient mechanism and defining a front chamber (16) permanently connected to a vacuum source (61) and a rear chamber (18) selectively connected to the front chamber (16) or to the atmosphere by a valve mechanism (20a, 32a, 40) actuated by a control rod (34) adapted to bear, by way of a plunger (32), against one face of a reaction disk (58) fastened to a push rod (56). According to the invention, the resilient mechanism returning the movable wall (12, 14) to its rear position of rest exerts a modulable force on the movable wall (12, 14).

12 Claims, 3 Drawing Sheets

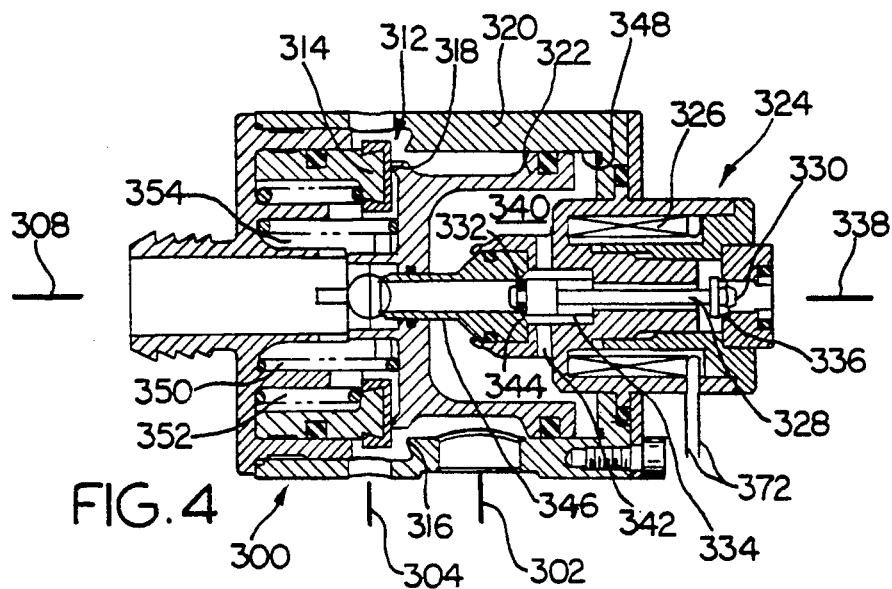
FIG.4
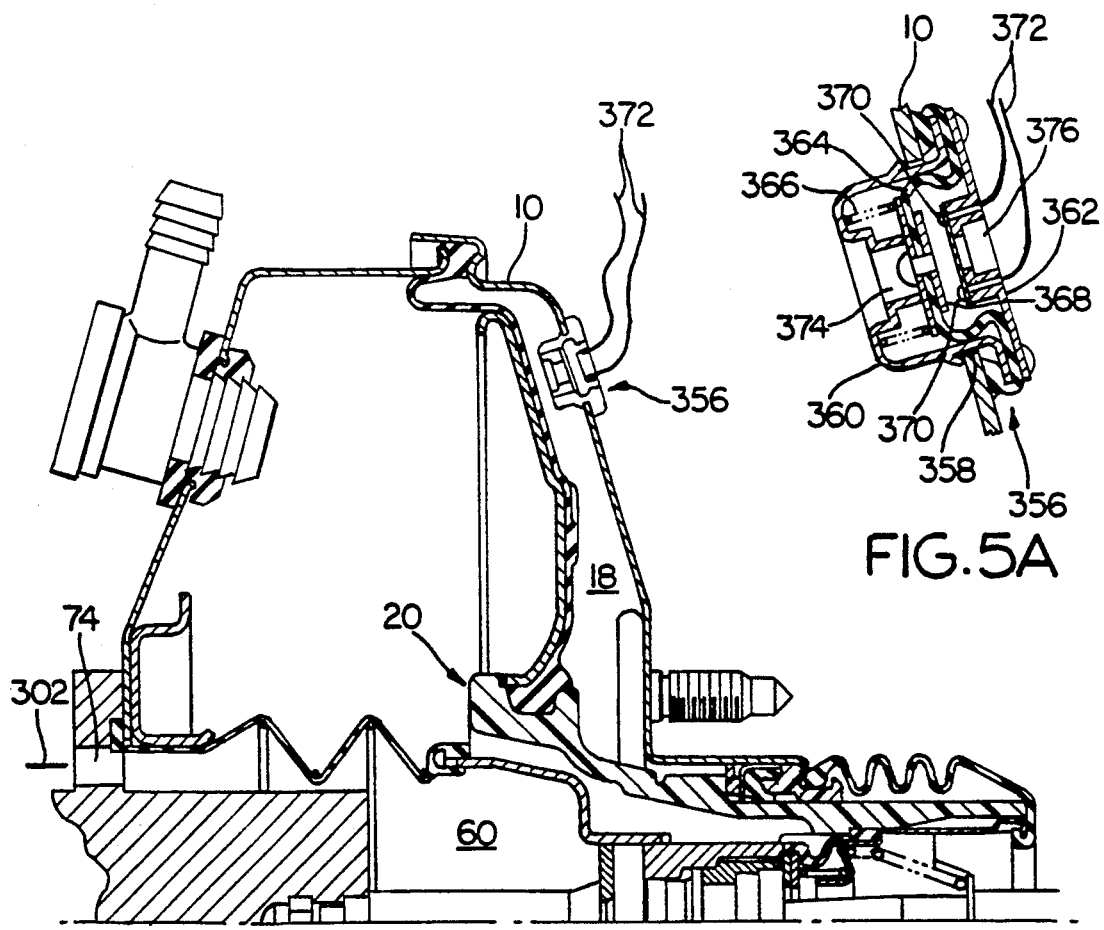
FIG.5
FIG.5A

PNEUMATIC BOOSTER

The present invention relates to pneumatic boosters, more particularly of the type used to provide brake assistance in automobile vehicles.

Conventionally, boosters of this kind comprise a movable wall returned to its rear position of rest by a resilient means and defining a front chamber permanently connected to a vacuum source and a rear chamber selectively connected to the front chamber or to the atmosphere by a valve means actuated by a control rod adapted to bear, by means of a plunger, against one face of a reaction disk fastened to a push rod.

Although their operation is satisfactory, boosters of this kind nevertheless have some disadvantages. Thus, in the event of the failure of the vacuum source, either because the vehicle engine is at rest or because a vacuum line has been damaged or cut, not only is the driver of the vehicle deprived of the assistance provided by the booster when he desires to brake, but in addition he must overcome the force due to the resilient return means provided for the movable wall, which means conventionally consists of a helical compression spring. This force typically amounts to twenty kilograms at the commencement of the actuation of the booster, and is often higher than this value. The booster then becomes an inconvenience for the driver.

Furthermore, this resilient return means may also be an inconvenience for the driver of the vehicle even when the vacuum source is not out of action, for example in the event of abrupt braking. The driver then exerts a considerable force on the brake pedal and the amplification of this force has the initial effect of compressing the movable wall return spring, thus dissipating a certain amount of energy at a time when the driver of the vehicle urgently needs that energy. It is therefore desirable that even in these cases the driver should not be inconvenienced by the booster.

In this context, it is an object of the present invention to provide a booster which supplies the required assistance under normal operating conditions and which offers no resistance when the vacuum source fails.

Another subject of the invention is a booster in which the force needed to be supplied by the driver of the vehicle to overcome the action of the return spring on the movable wall to return it to its position of rest is as slight as possible.

To this end, the booster of the invention is essentially characterized in that the resilient means returning the movable wall comprises a pneumatic spring, and in that this booster comprises a braking detector and selective-connection means, controlled by the braking detector, for selectively connecting the pneumatic spring to one of at least two different pressure sources in dependence on the appearance or disappearance of a braking situation and producing additional and selective brake assistance on the appearance of such a situation.

The pneumatic spring is preferably disposed in the front chamber of the booster.

In this case, the selective-connection means are advantageously arranged so as to connect the pneumatic spring to the vacuum source when a braking situation is detected, and so as to connect the pneumatic spring to a pressure source supplying a pressure at least equal to atmospheric pressure when the disappearance of a braking situation is detected.

In a simple embodiment, the pneumatic spring comprises a diaphragm fastened sealingly to the front wall of the casing and to a rigid web fastened sealingly to the piston or to the push rod.

The braking detector can be at least sensitive to the appearance of a given relative pressure in the rear chamber and can consist of the sensor part of a pneumatic valve.

Figure 2:
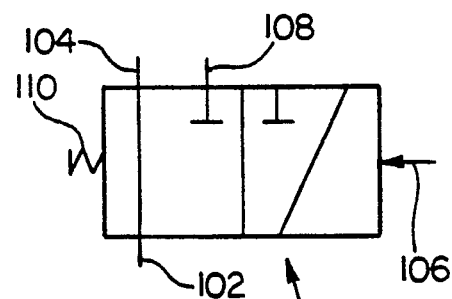
Figure 1:
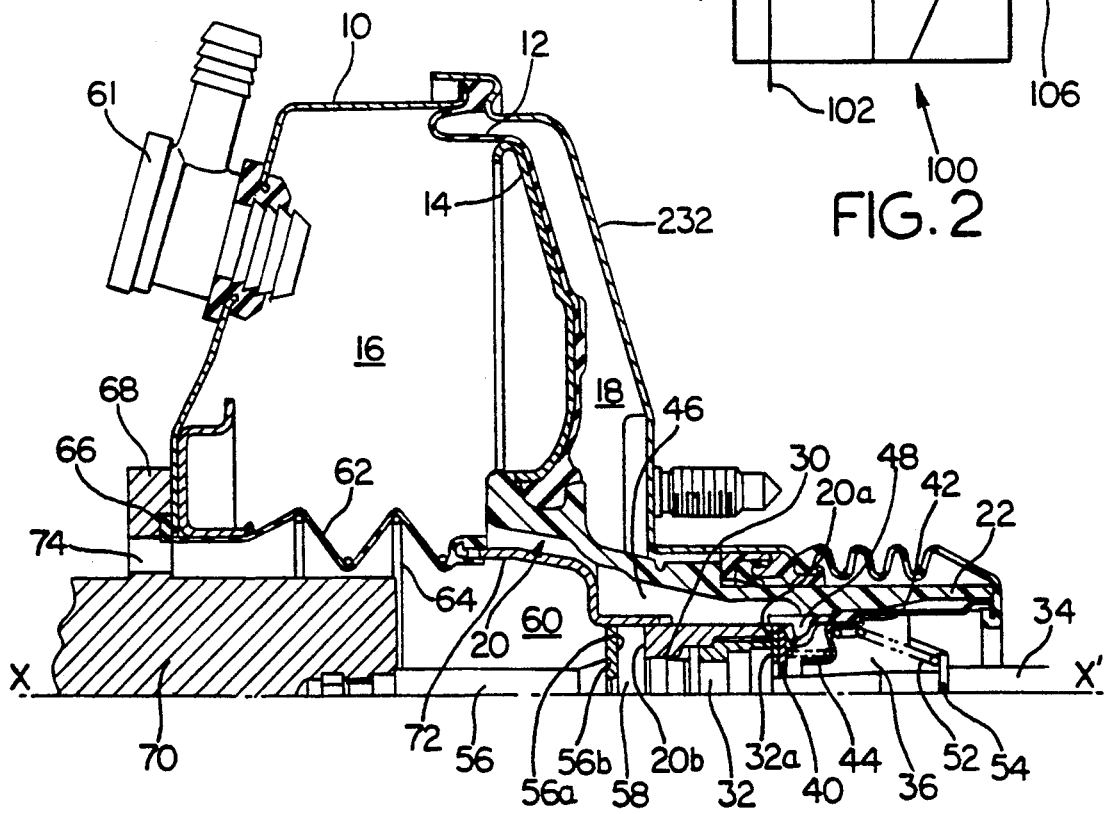
Figures 6, 6A:
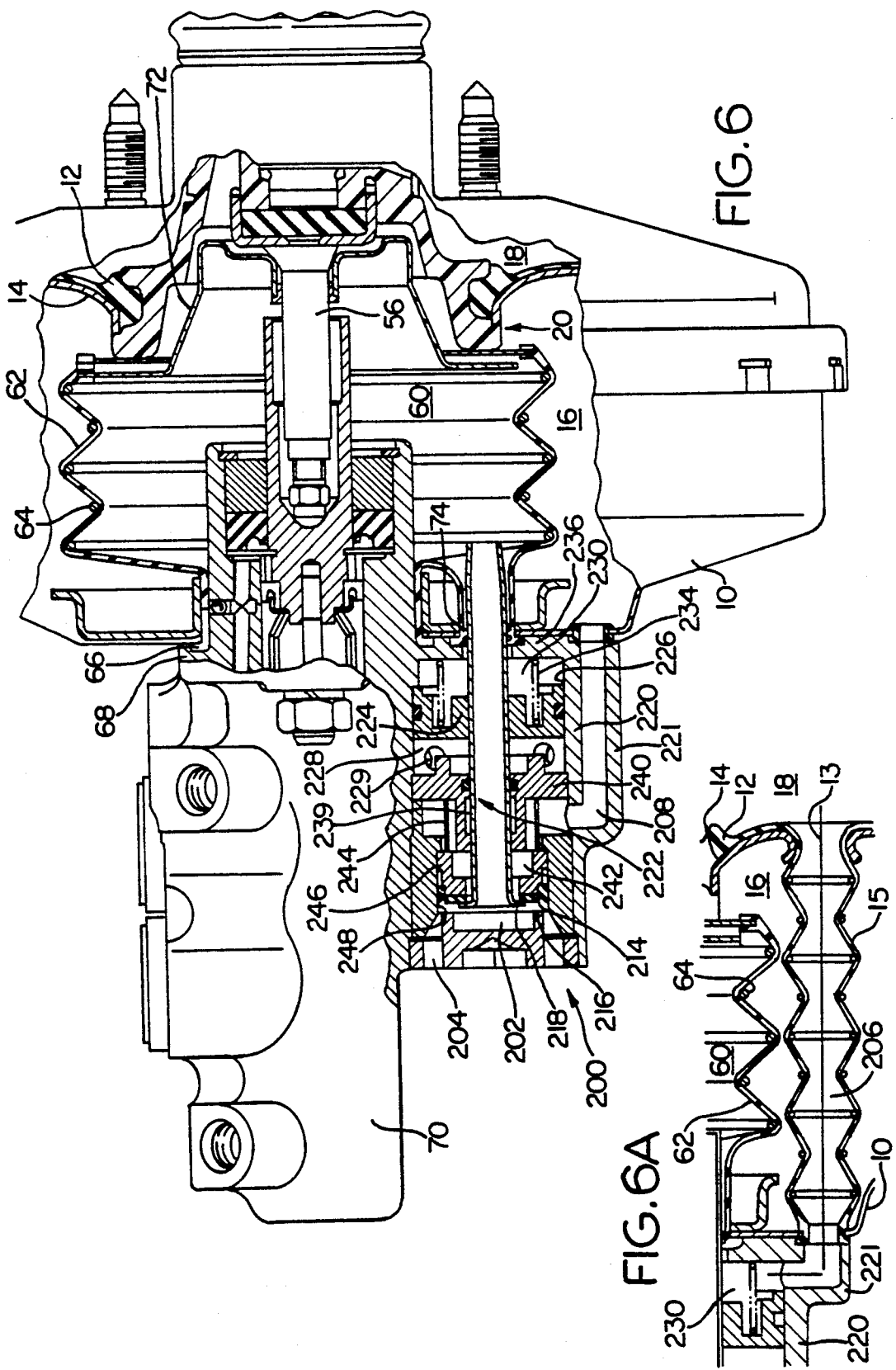

The invention will now be described by way of example with reference to the accompanying drawings in which:

FIG. 1 is a side view in longitudinal half-section showing the central part of a pneumatic brake-booster constructed in accordance with the present invention, FIG. 2 is a schematic view of a pneumatic valve which can be used with the booster of the invention, FIG. 3 is a schematic view of another pneumatic valve which can be used with the booster of the invention, FIG. 4 is a view in section of yet another embodiment of a valve which can be used with the booster of the invention, FIG. 5 is a view in half-section of a pneumatic booster for the control of a valve according to FIG. 4, FIG. 5A is a section view of a pressure sensor, and FIGS. 6 and 6A are views in section of a pneumatic booster and a valve according to another embodiment of the invention.

FIG. 1 shows a part of a brake-booster intended to be placed in the usual position between the brake pedal of a vehicle and the master cylinder controlling the hydraulic brake circuit of this vehicle. By convention, the term "front" of the booster indicates the direction in which the movable parts of the booster move when they are actuated, and the term "rear" is used to indicate the direction in which they move to return to their position of rest. In the Figures the front is situated on the left and the rear on the right.

The booster shown in FIG. 1 comprises an outer shell-shaped casing 10 possessing symmetry of revolution about an axis X—X'.

An unwinding flexible diaphragm 12 of elastomer material, reinforced in its central part by a metal support disk or skirt 14, defines, inside the space bounded by the casing 10, a front chamber 16 and a rear chamber 18. The outer peripheral edge of the diaphragm 12 is sealingly fastened on the outer casing 10. The inner peripheral edge of said diaphragm terminates in a bead held sealingly in an annular groove formed in the outer peripheral surface of a hollow booster piston 20 disposed along the axis X—X' of the booster. This hollow piston 20 is extended towards the rear in the form of a tubular portion 22 passing sealingly through the rear wall of the casing 10.

In its central part situated between the rear tubular portion 22 and the front portion, in which the diaphragm 12 and the skirt 14 are fastened, the piston 20 has a bore 30 in which is slidingly received a plunger 32 likewise possessing symmetry of revolution about the axis X—X'. The front end of a brake-booster control rod 34, likewise disposed along the axis X—X', is mounted balljointedly in the plunger 32. The rear end (not shown) of this rod 34, which projects outside the tubular portion 22 of the piston 20, is controlled directly by the brake pedal (not shown) of the vehicle.

The annular space 36 delimited between the control rod 34 and the tubular portion of the piston 20 leads out to the atmosphere at the rear of the booster, for example by way of an air filter. Towards the front this same annular space can communicate with the rear chamber 18 through a radial passage (not shown) formed in the central portion of the piston when assistance means controlled by the plunger 32 are actuated.

In conventional manner these assistance means comprise a three-way valve consisting of an annular valve closure member 40 mounted in the tubular portion of the piston and two annular valve seats 20a and 32a formed respectively on the central portion of the piston 20 and on the plunger 32.

The valve closure member 40 forms the front end, of smaller diameter, of a flexible elastomer sleeve whose rear end terminates in a bead mounted sealingly inside the tubular portion 22 of the piston 20. This bead is held in place by a metal cup 42, against which bears a compression spring 44 urging the valve closure member 40 in the forward direction.

The annular valve seat 32a is formed on the rear end face of the plunger 32. In comparable manner the annular valve seat 20a is formed on the rear end face of the central portion of the piston 20, around the seat 32a. Depending on the position of the plunger 32 inside the piston 20, this arrangement enables the valve closure member 40 always to bear sealingly against at least one of the valve seats 32a and 20a through the action of the spring 44.

A second passage 46 is formed in the central portion of the piston 20, approximately parallel to the axis X—X' of the latter, in order to bring the front chamber 16 of the booster into communication with an annular chamber 48 formed around the valve closure member 40, inside the tubular portion 22 of the piston 20. When the plunger 32 occupies its rear position of rest which is shown in FIG. 1, and in which the valve closure member 40 bears sealingly against the seat 32a of the plunger 32 and is at a distance from the seat 20a of the piston 20, the front chamber 16 and the rear chamber 18 of the booster are thus in communication with one another by way of the passage 46, the annular chamber 48 and the radial passage.

The plunger 32 is normally held in the rear position of rest, defined by a stop member, by means of a compression spring 52 interposed between the cup 42 and a washer 54, which in turn bears against a shoulder formed on the control rod 34.

In its central portion the piston 20 comprises an annular front face 20b, onto the center of which the bore 30 leads out. The annular front face 20b of the piston 20 acts on a rear face 56a of a push rod 56 through a reaction disk 58 of a deformable material, such as an elastomer. More precisely, the push rod 56 and the reaction disk 58 are disposed along the axis X—X' of the booster, in line with the control rod 34 and the plunger 32. The rear surface 56a of the push rod 56 is formed on a disk-shaped plate 56b constituting the rear end of the rod 56.

The operation of this known booster is conventional and may be briefly described as follows.

When the booster is installed in a vehicle, the front chamber 16 is permanently in communication with a vacuum source, for example by way of a connector 61, which may include a nonreturn valve.

In a first stage the force applied by the driver on the brake pedal has the effect of equalling the prestress force of the spring 52, less the prestress force of the spring 44. In the course of the slight movement of the control rod 34 and of the plunger 32, the valve closure member 40 then follows the seat 32a of the plunger 32 through the action of the spring 44 until it comes into contact with the piston seat 20a; the front chamber 16 and the rear chamber 18 of the booster are then isolated from one another.

In a second stage of the operation of the brake, the plunger 32 is moved sufficiently far forwards for the valve closure member 40 to be in sealing contact with the piston seat 20a and to start to move away from the plunger seat 32a. This being the case, the rear chamber 18 of the booster is isolated from the front chamber 16 and comes into communication with the atmosphere.

This thus has the consequence that a difference in pressure is established on the two faces of the skirt 14 of the piston 20 and moves the latter in the forward direction, so that assisted braking is achieved since the force exerted by the push rod 56 on the master cylinder piston is greater than the force exerted by the driver on the control rod 34.

On release of the brake, when the action on the control rod 34 is reduced, the latter is moved backward by the spring 52 and drives the plunger 32, thus causing the closure of the valve passage 32a–40 and the opening 30 of the valve passage 20a–40. The front chamber 16 and the rear chamber 18 are therefore once again in communication, and the pressures on the two faces of the skirt 14 tend to equalize. In conventional manner a compression spring (not shown), interposed between the piston 20 and the front wall of the casing 10, moves the piston 20 and the skirt 14 backward towards their position of rest.

It is precisely this spring which becomes an inconvenience in the event of failure of the vacuum source. The driver in fact then no longer has the benefit of assistance because, since the front chamber is no longer under vacuum, the pressures on the two faces of the skirt 14 are constantly equal. This disadvantage is further aggravated by the fact that the force exerted by the push rod 56 on the master cylinder piston is less than the force exerted by the driver on the control rod 34, the difference being dissipated in the compressive force of the return spring of the piston 20 to the extent of at least twenty kilograms.

This disadvantage is eliminated by the invention. It can in fact be seen in FIG. 1 that an additional chamber 60 has been disposed in the front chamber 16 of the booster. In the example illustrated this additional chamber 60 is obtained with the aid of a flexible tubular diaphragm 62. Rings 64 are disposed alternately inside and outside this diaphragm in order to enable it to be axially compressed and relaxed without undergoing substantial deformation in a radial direction. The tubular diaphragm 62 is sealingly fastened at its front end to the front wall of the casing 10, advantageously on the edges of the opening provided to receive a master cylinder, for example by means of a bead 66 held captive between the front wall of the casing 10 and a flange 68 of a master cylinder 70. Similarly, the rear end of the tubular diaphragm 62 is fastened sealingly on the outer peripheral edge of a rigid web 72, which has a frustoconical general shape and the rear part of which is in turn fastened sealingly to the piston 20 or to the push rod 56.

According to the invention the additional chamber 60 is connected to the atmosphere, for example by way of an opening 74 in the front wall of the casing 10 and/or in the flange 68 of the master cylinder 70.

The operation of the booster just described will be readily understood. When the vacuum source connected to the front chamber 16 by the connector 61 operates normally, it has been seen above that the front chamber 16 and the rear chamber 18 are in communication with one another in the position of rest. The entire booster is therefore under reduced pressure with the exception of the additional chamber 60, in which atmospheric pressure prevails. This atmospheric pressure is exerted on the forwardly turned face of the web 72, whose backwardly turned face is subjected to the reduced pressure.

A rearwardly directed force therefore exists which is exerted on the web 72 and therefore on the piston 20 to which it is fastened. Since the front chamber 16 is constantly in communication with the vacuum source, there is consequently still a force returning the piston 20 to its rear position of rest because of the additional chamber 60 which acts as a pneumatic spring.

According to one particularly advantageous aspect of the invention, it can be seen that the difference in the pressures exerted on the two faces of the web is constant, the front chamber 16 being permanently under reduced pressure and the pneumatic spring 60 being permanently under atmospheric pressure. The force exerted by the web 72 on the piston 20 for the purpose of bringing it back to its position of rest when the brake is released is constant. This is also true on application of the brake.

This means that the force expended by the driver and amplified by the booster is reduced only by a constant fraction throughout the stroke of the piston 20, contrarily to a conventional helical spring, for which the force required to compress the spring increases in proportion to the advance of the piston 20. The invention also permits this last-mentioned type of conventional operation, with a return force increasing in dependence on the stroke of the piston 20, simply by closing the opening 74.

By appropriate selection of the area of the web 72, or more correctly its projection in a plane at right angles to the axis X—X', that is to say more precisely the diameter of the front end of the web 72 to which the diaphragm 62 is connected, it will be possible to determine accurately the return force exerted by the pneumatic spring, for example so that at the commencement of the action of the booster it will be close to that of a conventional helical spring in order that the operation of the other parts of the booster may retain the same characteristics and offer the same possibilities, for example for the adjustment of jump or idle stroke, and in order that the driver of the vehicle equipped with the booster of the invention does not need to change his habits.

When the vacuum source connected to the connector 61 fails, atmospheric pressure is established in the front chamber 16. It is established immediately if the connector 61 is not provided with a nonreturn or vacuum retention valve, or after two or three braking operations if a valve of this kind is provided, the pressure in the front chamber increasing every time the brake is released and it is brought into communication with the rear chamber 18, where the atmospheric pressure established during the corresponding braking prevails. The entire booster, that is to say the front chamber 16, the rear chamber 18 and the pneumatic spring 60, is therefore under atmospheric pressure. In particular, the pressures on the front and rear faces of the web 72 are equal and the pneumatic spring 60 has become completely inoperative, no longer exerting any force at all on the piston 20.

There is therefore no longer any force returning the piston 20 to the rear inside the booster. The piston 20 is nevertheless urged towards the rear by the return springs of the master cylinder piston or pistons and of the brake pedal connected to the control rod 34, these springs generating a force which can be considered acceptable for operation under vacuum failure conditions.

It is possible to provide for the pressure in the pneumatic spring to be higher than atmospheric pressure. This variant offers various advantages. For example, in the case of vacuum source failure explained above, the front chamber 16 and the rear chamber 18 both quickly return to atmospheric pressure. If the pressure in the pneumatic spring 60 is higher than atmospheric pressure, there will then be on the two faces of the web 72 a difference of pressure which creates a return force bringing it back to its position of rest. The pressure in the pneumatic spring 60 can be selected to produce for the piston 20 a return force sufficient not to hinder the operation of the master cylinder 70 and far lower than that produced when the vacuum source is functioning normally, in order to avoid bringing about once again the previously mentioned inconvenience to the driver.

Another advantage of providing a pressure higher than atmospheric pressure in the pneumatic spring 60 consists in that it will be possible to reduce the area of the web 72 by means of which this force is produced and transmitted to the piston 20 when the vacuum source has not failed.

According to the invention a booster has thus been obtained whose operation is identical to that of a conventional booster when normal conditions exist, that is to say in which the piston 20 is constantly subjected to a return force and in which this return force no longer exists, or is minimal, in the event of failure of the vacuum source. In the event of such failure the driver no longer has the benefit of assisted braking, but on the other hand is no longer handicapped by this return force. Braking action will therefore be much more effective than with a conventional booster.

An important advantage of the present invention is that it is possible to make use of the pneumatic spring 60 for the purpose of similarly making the braking action more effective when the vacuum source has not failed. By modulating the pressure in the additional chamber 60 it is in fact possible likewise to reduce or cancel the return force of the piston 20 during a braking action and to restore this return force when the brake is released. For this purpose it is sufficient to reduce the pressure in the pneumatic spring 60 on braking, and, since the chamber 16 remains constantly under reduced pressure, the return force of the piston 20, resulting from the difference in pressure on the two faces of the web, will be reduced in the same proportion. The restoration of pressure in the pneumatic spring 60 when the brake is released ensures that the return force will increase to its initial maximum value when the booster is at rest.

Modulation of the pressure in the pneumatic spring 60 can be achieved in various ways. It can be controlled manually by the driver of the vehicle, but it is obviously preferable for it to be controlled automatically. The invention therefore provides such means for automatic control of the pressure in the pneumatic spring 60 in dependence on the state of actuation of the booster. These means advantageously consist of a three-way two-position pneumatic valve having an outlet connected to the pneumatic spring 60 and adapted to be selectively brought into communication with the atmosphere or with the vacuum source depending on the state of operation of the booster at the moment in question.

FIG. 2 illustrates schematically a valve of this kind, which is given the general reference 100. It comprises an outlet 102 which is intended to be connected to the opening 74 and to the pneumatic spring 60 of the booster shown in FIG. 1, and which in the position of rest shown in FIG. 2 is connected to an input 104 in communication with the atmosphere.

In the position of rest the pneumatic spring 60 is therefore definitely connected to the atmosphere. When the booster is actuated for braking purposes, the valve is switched to its second position by a control signal 106, in which position the outlet 102 is in communication with an inlet 108 connected to the vacuum source. The pneumatic spring 60 is thus then connected to the vacuum source and consequently no longer exerts a return force on the piston 20. When the booster returns to its position of rest the control signal 106 is interrupted and the pneumatic valve returns spontaneously to its position of rest, for example through the action of a return means 110, such as for example a spring. The control signal may for example be pneumatic and consist of the increase of pressure in the rear chamber 18 of the booster. It may also be an electric signal and be formed by the brake warning electric circuit (for lighting the "stop" lamps) or by a sensor sensing the pressure prevailing in the rear chamber 18 of the booster, the valve 100 being in that case a solenoid valve.

Instead of using a slide valve or a distributor as shown schematically in FIG. 2, it is possible to use a check valve, as shown schematically in FIG. 3.

In FIG. 3 can be seen a pneumatic valve 200, which comprises an outlet 202 intended to be connected to the opening 74 and to the pneumatic spring 60 of the booster shown in FIG. 1, and which comprises an inlet 204 connected to the atmosphere and an inlet 208 connected to the vacuum source. It also comprises a three-way valve 212 composed of a valve closure member 214 cooperating with two valve seats 216 and 218. The valve seat 216 is stationary and is formed on the body 220 of the pneumatic valve 200. The valve seat 218 is movable and is formed on a movable unit 222.

The valve 200 comprises a sensor part and a transmitter part. The sensor part is composed of a piston 224 sliding sealingly in a bore 226 in the body 220 and forming part of the movable unit 222. The piston 224 divides the bore 226 into a chamber 228 in which atmospheric pressure prevails permanently, and a chamber 230 connected by a communicating connection 206 to the rear chamber 18 of the booster shown in FIG. 1, for example by way of an opening 232 formed in the rear wall of the casing 10. A compression spring 234 is in addition disposed in the chamber 230 between the piston 224 and the end wall 236 of the bore 226. The piston 224 carries a rod 238 which passes sealingly through an intermediate wall 240 of the valve 200, then penetrating into the transmitter part of the valve.

The transmitter part of the valve 200 comprises a chamber 242, into which the rod 238 forming part of the movable unit 222 therefore penetrates. The chamber 242 thus comprises the other end of the rod 238, on which is formed the movable valve seat 218. It thus also comprises the valve closure member 214 and the stationary valve seat 216. It is connected by the inlet 208 to the vacuum source and by the inlet 204 to the atmosphere. Finally, a spring 244 urges the valve closure member 214 in the direction of the stationary valve seat 216 and of the movable valve seat 218, the valve closure member 214 being formed on a piston 246 sliding sealingly in a bore 248 formed in the body 220 of the valve.

The operation of the pneumatic valve 200 can easily be deduced from the explanations given above in connection with FIG. 3. When the booster shown in FIG. 1 is in the position of rest, the reduced pressure prevailing in its rear chamber 18 is transmitted, by way of the opening 232 and the communicating connection 206, to the chamber 230 of the pneumatic valve 200. This reduced pressure therefore prevails on one face of the piston 224, on whose other face the atmospheric pressure present in the chamber 228 prevails.

The piston 224 is therefore urged towards the rear (referring to FIG. 3) against the action of the spring 234, as is shown in the top half of FIG. 3. When this occurs, the rod 238 is in turn urged towards the rear together with the movable valve seat 218, which comes to bear against the valve closure member 214, which is urged in the forward direction by the spring 244. The valve closure member 214 is then at a distance from the stationary valve seat 216. The valve passage 214-216 is therefore then open and permits communication between the inlet 204 at atmospheric pressure and the outlet 202 communicating with the pneumatic spring 60.

As has been explained above, a return force is thus exerted on the piston 20.

On the actuation of the booster shown in FIG. 1 in the course of braking, it has also been seen above that the pressure in the rear chamber 18 increases until it reaches atmospheric pressure. This increase of pressure is transmitted to the chamber 230 of the valve 200 by way of the opening 232 and the communicating connection 206. Since the forces exerted on the two faces of the piston 224, as the result of the pressures exerted on them, vary and since in particular the piston 224 is no longer urged towards the rear, the piston 224 will move forwards (referring to FIG. 3) through the action of the spring 234. In this movement it carries with it the rod 238 and the movable valve seat 218 in the forward direction. The valve closure member 214, being urged forwards by the spring 244, will remain in contact with the valve seat 218 in its forward movement, until it comes into contact with the stationary valve seat 216, then allowing the valve seat 218 to move away from it.

The valve passage 214-216 between the inlet 204 and the outlet 202 is therefore closed, while the valve passage 214-218 between the chamber 242 and the outlet 202 is open, as shown in the bottom half of FIG. 3. It therefore follows that the outlet 202 is no longer connected to the atmosphere prevailing at the inlet 204, but is connected to the vacuum prevailing at the inlet 208, and thus that the pressure in the pneumatic spring will drop from atmospheric pressure to a value equal to the reduced pressure of the vacuum source.

With the aid of the invention, through judicious selection of the calibrations of the springs 234 and 244 and of the clearance between the valve seats 216, 218 and the valve closure member 214, it will advantageously be possible to ensure that the pressure at the outlet 202 of the valve 200 will be inversely proportional to the pressure at the inlet 206. Thus the return force exerted by the pneumatic spring 60 on the piston 20 will be inversely proportional to the pressure in the rear chamber 18 of the booster, or again that the greater the driver's need of powerful braking, the weaker will be the opposing force corresponding to that exerted by the pneumatic spring to return the piston 20 to its position of rest, this opposing force even being cancelled out when the braking is powerful, thus facilitating application of the force to be supplied by the driver.

According to the invention therefore a booster is thus definitely provided whose operation is practically identical to that of a conventional booster when normal conditions exist, that is to say in which the piston 20 is constantly subjected to a return force, with the exception that this return force is reduced in proportion as the braking force increases, and in which this return force no longer exists in the event of the failure of the vacuum source. In this event, in fact, it has been seen that atmospheric pressure prevails or is rapidly established in the rear chamber 18 of the booster. The same therefore applies to the pressure in the chamber 230 of the valve 200. The latter then assumes the position shown in the bottom half of FIG. 3, as has been explained above, thus opening the valve passage 214-218 between the inlet 208 and the outlet 202. Since in this hypothesis the inlet 208 is in a failed state and therefore at atmospheric pressure, this same pressure is communicated to the pneumatic spring 60, which becomes inoperative because the front chamber 16 of the booster is itself under atmospheric pressure.

FIG. 4 illustrates a variant of a pneumatic valve whose sensor part is electropneumatic. In FIG. 4 can be seen a pneumatic solenoid valve 300, which comprises an outlet 302 intended to be connected to the opening 74 and to the pneumatic spring 60 of the booster shown in FIG. 5, which is identical to that shown in FIG. 1 except for a detail which will be explained further on. The solenoid valve 300 also comprises an inlet 304 connected to the atmosphere and an inlet 308 connected to the vacuum source. It also comprises a three-way valve 312 formed by a valve closure member 314 cooperating with two valve seats 316 and 318. The valve seat 316 is stationary and is formed on the body 320 of the pneumatic valve 300. The valve seat 318 is movable and is formed on a movable unit 322.

The valve 300 comprises a sensor part and a transmitter part. The sensor part is composed of a solenoid valve 324 comprising a winding 326 and a movable armature 328. The movable armature 328 is tubular and carries at each end a valve member 330, 332. In the position of rest of the solenoid valve 324 its armature 328 is urged towards the left in FIG. 4 by a return spring 334.

In this position it opens a valve passage 330-336 between the valve member 330 and a valve seat 336 fastened to the body 320 and thus permits communication between an inlet 338 connected to the atmosphere and a chamber 340 via the interior of the tubular armature and holes 342 in the body of the solenoid valve.

In this same position it closes a valve passage 332-344 between the valve member 332 and a valve seat 344 fastened to the body 320, and thus prevents communication between the inlet 308 connected to the vacuum source and the chamber 340 via the holes 342 and the interior of a tubular passage 346 fastened to the body 320.

On the other hand, when it is excited the solenoid valve 324 gives its tubular armature 328 a working position towards the right in FIG. 4, where the valve passage 330-336 is closed and the valve passage 332-344 is open. In other words, the position of rest of the solenoid valve brings the chamber 340 into communication with the atmosphere, and its working position brings the chamber 340 into communication with the vacuum source.

The chamber 340 is defined in a bore 348 in the body 320 of the valve by the movable unit 322 consisting of a piston sliding sealingly in this bore 348 and around the tubular passage 346. The piston 322 is urged in the backward direction towards its position of rest (on the right in FIG. 4) by a return spring 350, and on its forwardly turned face carries the movable valve seat 318. The latter cooperates with the valve closure member 314, which in turn is urged in the backward direction (to the right in FIG. 4) by a return spring 352, in such a manner as also to be able to cooperate with the stationary valve seat 316 formed on the body 320 of the valve.

The valve closure member 314 and also the stationary valve seat 316 and the movable valve seat 318 are situated in the transmitter part of the valve 300, comprising a chamber 354 connected by the inlet 308 to the vacuum source and by the inlet 304 to the atmosphere.

The winding 326 of the solenoid valve 324 is excited when the booster is actuated for braking purposes. This excitation can for example be provided by the brake warning electric circuit (for lighting the "stop" lamps), by a sensor sensing the displacement of the booster piston 20, or by a sensor sensing the pressure in the rear chamber 18 of the booster. A sensor 356 of this kind is shown in FIG. 5A, where it can be seen that it has been disposed sealingly in an opening 358 formed in the rear wall of the casing 10. The sensor 356 comprises a rigid front shell 360 and a rigid rear shell 362 holding a flexible diaphragm 364 captive between them. The diaphragm 364 is urged towards the rear by a spring 366 and is provided on its rear wall with a conductive part 368. The rear shell 362 is provided with two contact studs 370, each connected to a conductor 372.

The front and rear shells are each provided with an opening 374 and 376 respectively, in such a manner that the rear face of the diaphragm 364 is subjected to atmospheric pressure and its front face to the pressure prevailing in the rear chamber 18.

When the booster is at rest, the chamber 18 is under reduced pressure, so that the difference between the pressures on the two faces of the diaphragm 364 produces on the latter a forwardly directed force against the front shell. When the booster is actuated the pressure in the chamber 18 increases, thus reducing the force on the diaphragm 364. The action of the spring 366 then becomes preponderant and pushes the diaphragm back. The conductive part 368 then comes to bear against and to make contact with the studs 370, thus closing the electric circuit between the conductors 372.

When the booster is at rest, the solenoid valve 324 is likewise at rest, and the valve passage 330-336 is open and brings the chamber 340 to atmospheric pressure, which is exerted on one face of the piston 322. Since the other face of the piston is subjected to the reduced pressure coming from the inlet 308, the piston 322 is urged forwards against the action of the spring 350. In this position the movable valve seat 318 pushes the valve closure member 314 in the forward direction, closing the valve passage 314-318 and opening the valve passage 314-316.

The atmospheric pressure present at the inlet 304 is then admitted at the outlet 302 and is communicated to the opening 74 and to the pneumatic spring 60 of the booster. A return force is therefore exerted on the piston 20.

When the booster is actuated, the pressure in the rear chamber 18 rises, which results in the closure of the electric circuit between the conductors 372. As a current source (not shown) is inserted on one of these conductors, this also has the consequence that the solenoid valve 324 is excited, its armature then moving to the right in FIG. 4. The valve passage 330-336 is then closed, while the valve passage 332-344 opens, bringing the chamber 340 into communication with the vacuum source at the inlet 308. The pressures on the two faces of the piston 322 being equal, the piston is then subjected only to the action of the spring 350, which pushes it towards the right in FIG. 4. As the valve closure member 314 is also urged in that direction, it will follow the movable seat 318 until it encounters the stationary valve seat 316. The valve passage 314-316 is thus closed, while the valve passage 314-318 opens, thereby permitting communication between the inlet 308 connected to the vacuum source and the outlet 302 connected to the pneumatic spring 60. The return force on the piston 20 of the booster thus falls with the increase of pressure in the rear chamber 18.

According to the invention therefore a booster is thus definitely provided whose operation is practically identical to that of a conventional booster when normal conditions exist, but in which the booster piston is subjected to a return force inversely proportional to the braking force, while this return force no longer exists in the event of failure of the vacuum source. In the last-mentioned case, in fact, the increasing pressure in the rear chamber 18 has the consequence that the electric circuit between the conductors 372 is constantly closed. The solenoid valve 328 is therefore constantly excited, thus bringing the chamber 340 into connection with the inlet 308 at which atmospheric pressure now prevails. The pressures on the two faces of the piston 322 being equal, the spring 350 pushes it towards the right in FIG. 4, with subsequent closure of the valve passage 314-316 and opening of the valve passage 314-318, so that communication is established between the inlet 308 and the outlet 302. Since by hypothesis the inlet 308 is in a failed state, the atmospheric pressure prevailing there is thus transmitted to the pneumatic spring 60, thereby cancelling the return force on the piston 20 in accordance with the object of the invention, so as to give easier braking in the event of failure of the pneumatic assistance.

In addition, in a particularly advantageous manner according to the invention a booster constructed in this way has dimensions identical to those of a conventional booster, while offering a mode of operation more comfortable for the driver in the event of failure of the pneumatic assistance. With performance identical to that of a conventional booster, the size of the booster can even be reduced if use is made of a valve controlling or modulating the pressure in the pneumatic spring. A valve of this kind can advantageously be placed in any position in the engine compartment of the vehicle and can be sufficiently small in size to eliminate all installation problems.

In particular, the pressure modulation valve can be disposed in the immediate vicinity of the booster, and may even be structurally connected to the latter or to the master cylinder associated with the booster, or to both, in order to obtain a compact unit which is easy to install. This is what is illustrated in FIGS. 6 and 6A, where the pneumatic modulation valve is for example an embodiment of the valve shown schematically in FIG. 3.

In FIG. 6 can be seen a booster of the type described in connection with FIG. 1, wherein the same members are given the same reference numbers, and which will therefore not be described in detail. The master cylinder 70 associated with the booster is also shown in partial section.

The pneumatic valve 200 is also shown in the immediate vicinity of the booster and of the master cylinder. The movable unit 222 of this valve comprises the piston 224 sliding sealingly in the bore 226 of the body 220. The piston 224 shares the bore 226 in a chamber 228 in which atmospheric pressure prevails permanently because of openings 229 formed in the body 220 and leading into this chamber, and a chamber 230 connected to the rear chamber 18 of the booster, for example by way of a duct passing out of the booster and leading to an opening provided in the rear wall of the casing 10 and advantageously, according to the embodiment shown in FIG. 6A, by way of a duct 206 passing into the booster. An opening 13 is provided in the skirt 14 of the piston 20 and the unwinding diaphragm 12 is formed with a tubular extension 15 penetrating through this opening 13 into the front chamber 16 as far as the front wall of the casing 10, where it is received sealingly. The body 220 is formed with an extension 221 applied sealingly against the tubular extension 15 at the point where the latter is received in the front wall of the casing 10.

A compression spring 234 is disposed in the chamber 230 between the piston 224 and the end wall 236 of the bore 226. The piston 224 is fastened to a rod 239 which passes sealingly through an intermediate wall 240 of the valve 200, then penetrating into the transmitter part of the valve 200.

The transmitter part of the valve 200 comprises a chamber 242 into which the end of the rod 239 forming a movable valve seat 218 penetrates. The movable valve seat 218 cooperates with a valve closure member 214 formed on a piston 246 sliding sealingly in a bore 248 formed in the body 220 of the valve. The valve closure member 214 is also adapted to cooperate with a stationary valve seat 216 formed on the body 220 of the valve 200, and it is urged by a spring 244 in the direction of the valve seats 216 and 218. The spring 244 is disposed in the chamber 242 delimited by the intermediate wall 240 and the piston 246 carrying the valve closure member 214, this chamber 242 being connected to the vacuum source by an inlet 208, which inlet 208 is advantageously connected to the front chamber 16 of the booster, where this vacuum prevails through an extension 221 of the body 220 of the valve 200, the extension being sealingly connected to an opening in the front wall of the casing 10 and leading into the front chamber 16.

The stationary valve seat 216 and the movable valve seat 218 together with the valve closure member 214 form a three-way valve controlling or modulating the pressure at the outlet 202 intended to be connected to the opening 74 and to the pneumatic spring 60 of the booster, for example by way of a duct passing out of the valve 200 and advantageously, according to the embodiment illustrated, by way of the interior of the rod 239 which is in the form of a cylinder and whose rear end penetrates sealingly into the end wall 236 of the valve 200 and the opening 74 in the front wall of the casing 10.

The operation of the pneumatic valve just described can easily be deduced from the explanations given above, and from those which were given in connection with FIG. 3. Under normal operating conditions, when the booster is in the position of rest the reduced pressure prevailing in the rear chamber 18 is transmitted via the opening 13, the tubular extension 15 of the diaphragm 12, the communicating connection 206 and the extension 221 of the body 220 to the chamber 230. This reduced pressure is exerted on the rear face of the piston 224, the front face of which is subjected to the atmospheric pressure prevailing in the chamber 228. The piston 224 is therefore urged backwards against the action of the spring 234. The rod 239 is therefore likewise urged backwards together with the movable valve seat 218, which in turn urges the valve closure member 214 backwards against the action of the spring 244. The valve closure member 214 is thus moved away from the stationary valve seat and permits communication between the inlet 204 at atmospheric pressure, the chamber 202 and the interior of the rod 239, which penetrates into the pneumatic spring 60, thus producing the return force on the piston 20.

When the booster is actuated, the increase of pressure in the rear chamber 18 is transmitted to the chamber 230 through the opening 13 and the tubular extension 15. The rearwardly directed force which is exerted on the piston 224 decreases and the spring 234 will move the piston 224 forwards, thus driving forwards the hollow rod 239 and the movable valve seat 218. The valve passage 214–216 closes, while the valve passage 214–218 opens. The chamber 202 is therefore in communication with the chamber 242, which in turn is in communication through the outlet 208 with the front chamber 16 of the booster, where a vacuum permanently prevails. The pneumatic spring 60 is therefore brought into communication with the front chamber 16, thus causing a reduction of the return force exerted on the piston 20.

Here again therefore a booster has been produced in accordance with the invention whose operation is identical with that of a conventional booster under normal operating conditions, with the advantage of a reduction of the return force on the piston 20 during the operation of the brakes, so that less force on the part of the driver is required for an identical action on the master cylinder. This booster also has the features of the invention, namely the fact that the return force on the piston 20 no longer exists in the event of failure of the vacuum source.

In this event, in fact, the front chamber 16 and rear chamber 18 of the booster rapidly return to atmospheric pressure. This therefore is also true of the chambers 242 and 230 respectively connected to them. The entire valve 200 is therefore subjected to atmospheric pressure.

The movable unit 222 is therefore in its forward position through the action of the spring 234, which is also true of the valve closure member 214 through the action of the spring 244. The valve passage 214–216 is thus permitting communication between the pneumatic spring 60 and the front chamber 16, where atmospheric pressure prevails. The return force exerted by the pneumatic spring 60 on the piston 20 therefore falls in proportion as the pressure in the front chamber 16 increases, until said force is completely cancelled.

The invention is obviously not restricted to the embodiments which have been described by way of example, but is capable of undergoing numerous modifications which will occur to those versed in the art. Thus, for example, the invention can be applied to boosters in a tandem arrangement or to those having an additional assistance chamber. Similarly, the pneumatic spring of the invention can be constructed in a different form, for example being annular in shape. Provision can also be made to make the pneumatic valve shown in FIG. 6 integral with or fastened to the master cylinder, or integral with or fastened to the booster. In a construction of this kind provision may be made to construct the booster or the master cylinder shown in FIG. 6 in association with a pneumatic valve constructed in accordance with FIG. 4.

Similarly, when the booster of the invention is used with a modulation valve, provision may be made for the latter to be connected to a source of pressure higher than atmospheric pressure in order to obtain a greater return force for returning the booster piston to the position of rest or for reducing the area of the web by means of which this return force is transmitted to the booster piston. It will then be sufficient to adapt accordingly the calibrations of the modulation valve springs. Failure of this pressure source will then have the sole consequence of a return to the operation of the modulation valve in the manner described above.

We claim:

1. A pneumatic brake-booster, comprising a casing inside which is situated a movable wall returned to a rear position of rest by resilient means and defining a front chamber connected permanently to a vacuum source and a rear chamber connected selectively to one of the front chamber and atmosphere by valve means actuated by a control rod adapted to bear by means of a plunger against one face of a reaction disk adjacent a push rod, characterized in that the resilient means returning the movable wall comprises a pneumatic spring, and the booster comprises a braking detector controlling selective connection means for connecting selectively the pneumatic spring to said vacuum source when said rear chamber is connected to atmosphere and to a pressure source supplying a pressure at least equal to atmosphere pressure when said rear chamber is connected to the front chamber.

2. The booster according to claim 1, characterized in that the pneumatic spring is disposed in the front chamber of the booster.

3. The booster according to claim 2, characterized in that the pneumatic spring comprises a diaphragm fastened sealingly to a front wall of the casing and to a rigid web fastened sealingly to one of the piston and the push rod.

4. The booster according to claim 1, characterized in that the braking detector is at least sensitive to an appearance of a given relative pressure in the rear chamber.

5. The booster according to claim 4, characterized in that the selective connection means comprises a pneumatic valve.

6. The booster according to claim 5, characterized in that the pneumatic valve comprises a transmitter part comprising a three-way valve equipped with a valve closure member cooperating with a stationary valve seat and a movable valve seat.

7. The booster according to claim 6, characterized in that the valve closure member of the three-way valve of the transmitter part is actuated by one of a piston and a solenoid valve comprising a sensor part which constitutes the braking detector.

8. The booster according to claim 5, characterized in that the pneumatic valve comprises a sensor part constituting the braking detector.

9. The booster according to claim 8, characterized in that the sensor part comprises a piston sliding in a chamber in which prevails the pressure in the rear chamber of the booster.

10. The booster according to claim 8, characterized in that the sensor part comprises a solenoid valve.

11. The booster according to claim 10, characterized in that the solenoid valve is excited by a signal supplied by a sensor sensing the pressure in the rear chamber of the booster.

12. The booster according to claim 10, characterized in that the solenoid valve is excited by a signal supplied by a sensor sensing the displacement of the booster piston.

* * * * *